United States Patent Office 2,924,482
Patented Feb. 9, 1960

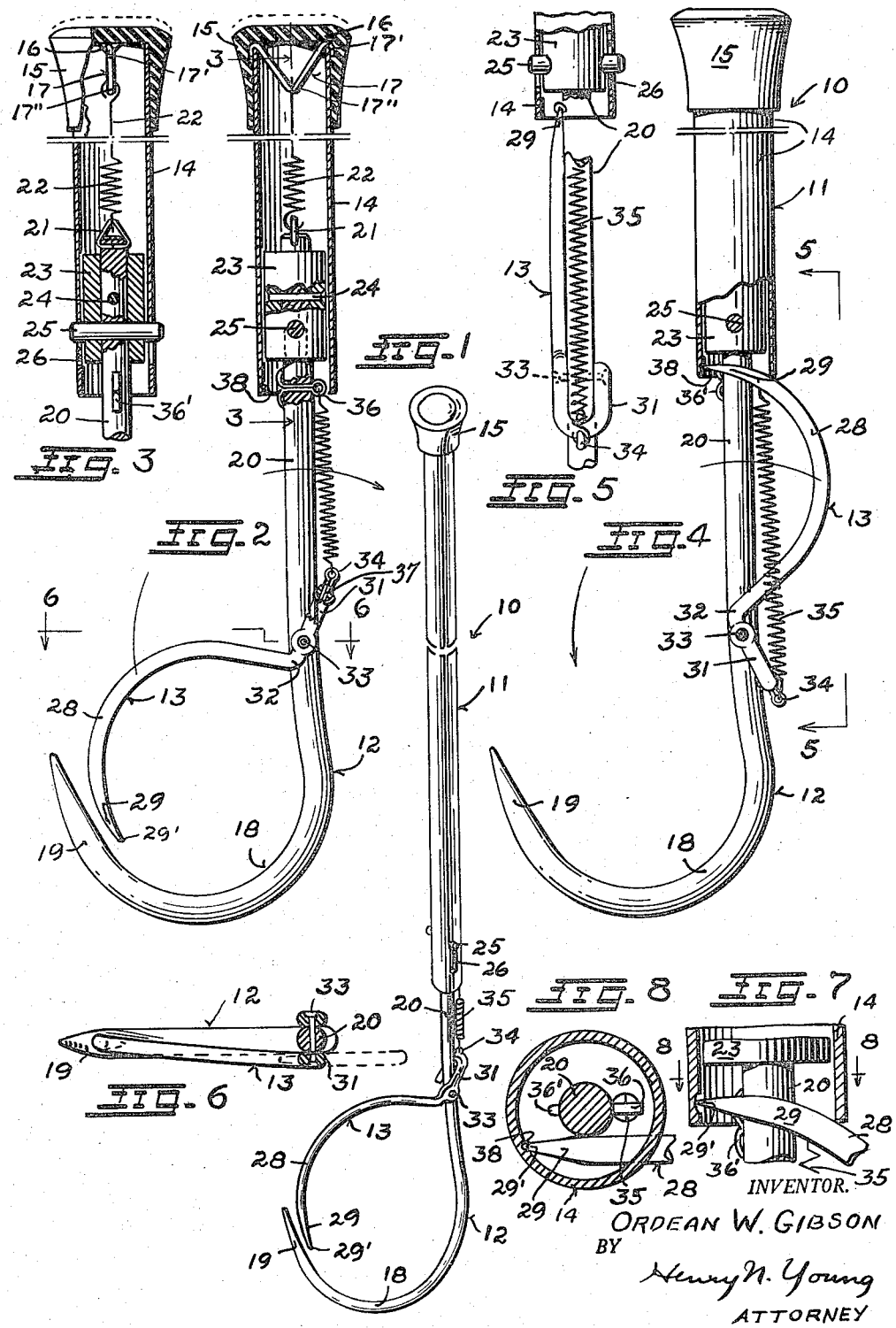

2,924,482

GRAPPLE GAFF

Ordean W. Gibson, Alameda, Calif.

Application July 1, 1957, Serial No. 669,163

4 Claims. (Cl. 294—26)

The invention relates to a grapple-type gaff by which a fish may be automatically gripped by and between cooperative hooks of the gaff following its engagement by one hook of the gaff.

Recalling that a conventional fisherman's gaff essentially provides a handled hook for a holding pull engagement of its point in a gill opening of a fish or in the flesh of the fish, the present gaff provides a normally withdrawn secondary, or grapple, hook for operation in cooperative opposition to the pull hook for preventing the unhooked escape therefrom of a fish engaged by the point of the pull hook, and a principal present object is to provide for the automatic application of the grapple hook when a fish has been initially and hookedly engaged by the primary pull hook.

Another object of the invention is to provide a gaff structure of the character described in which the grapple hook is normally held in inoperative relation to the pull hook in such a manner that solely a pulling engagement of the latter hook with a fish releases the grapple hook from its holding cooperation with the pull hook.

A further and more specific object is to provide a grapple gaff of the character described wherein the shank of the primary hook extends from a handle element for its axial dislodgment with respect to the latter as the releasing means for the secondary hook.

An added object is to provide a grapple hook assembly which is readily adaptable for its use as a baited hook on a fishing line.

The invention possesses other objects and features of advantage, some of which, with the foregoing, will be set forth or be apparent in the following description of a typical embodiment thereof, and in the accompanying drawings, in which, Figure 1 is a perspective view of a grapple gaff embodying the features of my invention.

Figure 2 is an enlarged fragmentary and partly sectional view of the gaff having its hook elements related as in Figure 1.

Figure 3 is a fragmentary section taken at the line 3—3 in Figure 2.

Figure 4 is a view corresponding to that of Figure 2, but showing the secondary hook as held in withdrawn position.

Figure 5 is a fragmentary and partly sectional view taken from the line 5—5 in Figure 4.

Figure 6 is a partly sectional view taken at the line 6—6 in Figure 2.

Figure 7 is an enlarged fragmentary view of the showing of Figure 4.

Figure 8 is a section taken generally at the line 8—8 in Figure 7.

Essentially, the present grapple-gaff unit 10 of my invention comprises a handle element 11, a primary pull-hook element 12, and a secondary grapple hook element 13. The handle element 11 comprises a tubular member 14 of appropriate length and of convenient diameter and external finish for its gripping by a user's hand, is capped at one end by a knob 15 of rubber or the like, and is provided at said end, and within the cap, with notches 16 which receive hook ends 17' of a V-shaped stirrup 17 which is arranged to have its bight portion 17" engaged as a spring anchor.

The primary, or pull-hook, element 12 is of a relatively rigid structure and material, may be suitably formed of round stock, and provides a terminal return-bend hook portion 18 which has a barbless point 19. The hook portion 18 extends forwardly from a straight round shank portion 20 which extends into the handle member 14 from the open end thereof and is provided with a terminal spring anchor loop 21 between which and the bight 17" of the stirrup 17 a helical tension spring 22 is connected for urging a withdrawn disposal of the terminal portion of the shank 20 within the handle space.

Noting that the hook shank 20 is appreciably smaller than the bore of the tube 14, the inner portion of said shank extends axially through a cylindrical sleeve or block 23 which is freely slidable in the handle tube bore and is fixed to the shank by a rivet pin 24 which is diametrically engaged through the shank and block. A pin 25 extends fixedly and diametrically through the shank 20 and through and beyond the block 23 for the sliding engagement of its end portions in relatively short opposed slots 26 provided in opposite sides of the tube 14 thereat, whereby the slot ends are arranged to function as a stop means to limit the relative reciprocation of the hook and tube, against or by the action of the spring 22, to the effective length of the slots while preventing a relative rotation of the shank and handle.

The grapple hook 13 of the present structure is generally sickle-shaped and is formed of flat stock of a suitable material to provide an arched planar hook portion 28 terminating in a barbless point 29, said hook portion 28 extending integrally from a portion 31 which is angularly related to the portion 28 at its juncture point 32 therewith. At a point thereof adjacent the juncture point 32, the portion 31 is provided with a transverse opening receiving therethrough a pivot pin 33 which extends diametrically through the hook element 12 substantially at the juncture of its hook and shank portions 18 and 20 respectively and in a line parallel to that of the pin 25. The extremity of the portion 31 is provided with an eye 34 providing an anchorage for one end of a tension spring 35 extending therefrom to an anchoring engagement of its other end with an eye 36 provided on the hook shank generally opposite the open end of the handle tube 14 and outwardly of the block 23; as is particularly shown, the eye 36 comprises the bight of a cotter key 36' extending through a hole in the shank 20 in fitted relation thereto.

The present hook assembly is essentially such that the hook 13 is forcibly urged by the spring 35 to freely and quickly assume its position of Figure 2 wherein a working portion of its point 29 is in inwardly lapped relation to the point 19 of the primary hook 12 for a cooperative fish-piercing and gripping action of the points. Preferably, and as shown, the portion 31 of the hook 13 comprises a U-bend having its free end extremity provided with an opening for receiving the hinge pin 33 whereby the portion 31 may span the hook portion thereat, with its bend part providing the spring-connection eye 34 in the common plane of action of the hooks 12 and 13; as particularly shown, the eye 34 comprises the bight of a cotter-pin 37 having its shank retainedly engaged through an opening in the bend of the portion 31.

The securing or grapple hook 13 is arranged to be held against the resistance of the spring 35 in the inoperative position shown for it in Figure 4, in which position the tip 29' of its point 29 is engaged within the open end of the handle tube 14 at a more or less recessed interior-tube point 38 while the hook shank 20 is withdrawn into the handle by the action of the spring 22 and to the limit imposed by the slots 26, whereby the hook is then restrained from swinging into its cooperative relation with the point of the primary hook 12. When the set, or triggered gaff is to be used, the tip 29' of the hook 13 is engaged in the recess 38 to inoperatively dispose the hook for a working application of the gaff, and when the primary gaff hook 12 is thereafter applied to a fish with a pulling-out, or hooking action, the resultant dislodging of the shank is arranged to release the point of the hook 13 for a rapid swinging of the latter hook under the influence of the spring 35 to cooperate in the described manner with the point 19 of the hook 12 for a gripping and securing of the engaged fish by the grapple assembly comprising the hooks 12 and 13.

It will now be noted that the present operative grapple gaff arrangement is readily adapted, by appropriate obvious changes in the size and/or forms of its parts, to provide a baitable grapple hook assembly for direct attachment to a fishline. In such a case, the tubular member 14 might be of proportionally smaller diameter, and be provided at its rearward end with a direct line connection. Also, the point 19 of the pull-hook 12 might be barbed to retain bait thereon, whereby a fish pulling on the baited hook 12 through the bait will release the grapple hook 13 for its fish-retaining functioning as in the present gaff assembly.

From the foregoing description taken in connection with the accompanying drawings, the advantages of the present grapple gaff will be readily understood by those skilled in the art to which the invention appertains. While I have shown and described a structure and arrangement which I now consider to be a preferred embodiment of my invention, I desire to have it understood that the showings are primarily illustrative, and that such changes and developments may be made, when desired, as fall within the scope of the following claims.

I claim:

1. In a gaff or the like, a first element providing a planar arcuate pull-hook portion extending laterally from a straight shank portion to a terminal gaffing point arranged for its hooking engagement with an object to be gaffed, a second element providing a planar arcuate grapple-hook portion for movement in the plane of the pull-hook portion of the first element and having a terminal point arranged for its holding coaction with an article which has been gaffed by the point of the pull-hook portion of the first element, a pivot means mutually connecting the second element directly to said first element for a relative swinging of the hooks to and from their coacting relation and solely in their common plane about a common axis, an elongated tubular third element constituting a handle and telescopically receiving a terminal portion of the shank of the pull-hook element for a longitudinal reciprocation of said shank with respect to the handle element, a stop means on said shank portion of the first element, limiting means on said handle element, said stop means engaging said limiting means to limit the relative longitudinal reciprocation of said first and handle elements in a forward and rearward direction thereof, a first spring means constantly and yieldingly urging a retention of the first element in a limiting indrawn relation thereof to the third element as determined by the aforesaid stop means, a second spring means constantly and yieldingly coactive between the first and second elements to urge a cooperative grappling disposal of the grapple hook of the second element with respect to the pull hook of the first element, and a detent means directly cooperative between the grapple hook and said handle element for releasably securing the grapple hook in withdrawn relation to the pull hook against the resistance of the second spring means only while the shank of the pull-hook element is in its limiting indrawn relation to the tubular element, an outdrawn disposal of the pull-hook shank with respect to the tubular element being arranged to render said detent means inoperative for permitting the movement of the released grapple hook by said second spring into cooperative working relation with the pull hook.

2. The structure of claim 1 wherein the stop means comprises a member which extends fixedly and radially from the pull-hook shank and is freely movable in a slot provided within the side of the tubular element longitudinally thereof for the alternative engagement of the member with the slot ends for limiting the reciprocative movement of the shank with respect to the element.

3. In a grapple gaff, an elongated handle element, a pull-hook element comprising a forward hook portion extending beyond and laterally from a rearward shank portion and terminating in a rearwardly-directed free hook point, means engaging said shank portion of the pull-hook element with the handle element for a relative reciprocation of the elements longitudinally thereof, a stop means on said shank portion, limiting means on said handle, said stop means engaging said limiting means to limit the relative longitudinal reciprocation in a forward and rearward direction thereof, a first spring means constantly operative between the pull-hook and the handle elements to urge a limiting rearward disposal of the pull-hook element as determined by the aforesaid stop means, a grapple-hook element comprising an arcuate hook portion extending laterally from a lever arm portion and terminating in a free hook point, a pivot pin connecting intermediate points of the pull-hook element and the grapple-hook element to each other with the hooks in mutual opposition to provide for a swinging of the grapple hook of the latter element in the general plane of the pull-hook of the former element between a limiting position in which said hook points of the elements are respectively cooperative as an object-gripping means and a limiting rearward position in which said points of the elements are mutually separated for receiving between them an object to be engaged by the gaff, means for retainedly engaging the rearwardly-disposed grapple-hook element with the handle element while the shank of the pull-hook element is rearwardly disposed with respect to the handle element by the action of the first spring means, and a second spring means coactive between the lever arm of the grapple-hook element and a point of the shank of the pull-hook element to constantly urge an object-gripping disposal of the grapple-hook element, the arrangement being such that a rearward pulling of the handle element relative to the pull-hook element against an object engaged by the hook of the pull-hook element is operative to free the grapple-hook element from the handle element for effecting an operative application of the point of the grapple hook to the object by the action of the second spring means.

4. A structure in accordance with claim 3 in which the handle element is tubular and has its forward bore portion slidably receiving the rearward part of the shank of the pull-hook element, the first spring is disposed within the handle element, and the bore of the handle element is radially engageable by the point of the grapple-hook element therein for retaining said grapple-hook element in inoperative position against the urge of the second spring when the shank of the pull-hook element is disposed in its limiting rearward position in the bore of the handle element.

References Cited in the file of this patent

UNITED STATES PATENTS

| | | |
|---|---|---|
| 659,383 | Warren | Oct. 9, 1900 |
| 718,079 | Bindhammer | Jan. 13, 1903 |
| 2,543,645 | Sawyer | Feb. 27, 1951 |
| 2,772,111 | Eide | Nov. 27, 1956 |